United States Patent
Nakaike et al.

(10) Patent No.: US 11,030,069 B2
(45) Date of Patent: *Jun. 8, 2021

(54) MULTI-LAYER AUTOSCALING FOR A SCALE-UP CLOUD SERVER

(71) Applicant: INTERNATIONAL BUSINESS MACHINES CORPORATION, Armonk, NY (US)

(72) Inventors: Takuya Nakaike, Yokohama (JP); Moriyoshi Ohara, Yokohama (JP); Takanori Ueda, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/698,726

(22) Filed: Sep. 8, 2017

(65) Prior Publication Data

US 2019/0079845 A1 Mar. 14, 2019

(51) Int. Cl.
*G06F 11/34* (2006.01)
*G06F 9/50* (2006.01)
*G06F 9/455* (2018.01)
*G06F 11/30* (2006.01)

(52) U.S. Cl.
CPC ...... *G06F 11/3409* (2013.01); *G06F 9/45545* (2013.01); *G06F 9/45558* (2013.01);
(Continued)

(58) Field of Classification Search
CPC .. G06F 9/455; G06F 11/3409; G06F 9/45545; G06F 9/45558; G06F 9/5005;
(Continued)

(56) References Cited

U.S. PATENT DOCUMENTS 8,756,610 B2   6/2014  Dasgupta et al.
9,547,534 B2 * 1/2017  Dettori ............... G06F 9/5072
(Continued)

OTHER PUBLICATIONS

Pham, "Autonomic fine-grained replication and migration at component level on multicloud", Vietnam J Comput Sci 4:39-49, 2017, pp. 1-11.
(Continued)

*Primary Examiner* — Benjamin C Wu
(74) *Attorney, Agent, or Firm* — Tutunjian & Bitetto, P.C.; Randall Bluestone (57) ABSTRACT

A computer-implemented scaling method, an apparatus, and a computer program product for detecting whether a performance of a system reaches a target performance are provided. The method includes scaling a layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled. The method also includes scaling hardware resources used for executing the layered software environment in the system in response to the performance of the system not reaching the target performance before scaling of the first layer software environment or after scaling of the second layer software environment.

7 Claims, 4 Drawing Sheets

(52) U.S. Cl.
CPC .......... *G06F 9/5005* (2013.01); *G06F 9/5016* (2013.01); *G06F 9/5027* (2013.01); *G06F 11/3006* (2013.01); *G06F 11/3433* (2013.01); *G06F 2009/45579* (2013.01); *G06F 2009/45591* (2013.01); *G06F 2209/501* (2013.01)

(58) Field of Classification Search
CPC .. G06F 9/5016; G06F 9/5027; G06F 11/3006; G06F 11/3433; G06F 2209/501; G06F 9/505
See application file for complete search history.

(56) References Cited

U.S. PATENT DOCUMENTS

| | | | | |
|---|---|---|---|---|
| 9,571,347 | B2* | 2/2017 | Siddiqui | H04L 41/0896 |
| 10,346,203 | B2* | 7/2019 | Stich | G06F 9/5011 |
| 2003/0172145 | A1* | 9/2003 | Nguyen | G06Q 10/10 709/223 |
| 2007/0067777 | A1 | 3/2007 | Branda et al. | |
| 2015/0317173 | A1* | 11/2015 | Anglin | G06F 9/45558 718/1 |
| 2016/0055025 | A1* | 2/2016 | Jul | G06F 9/45558 718/1 |
| 2019/0004837 | A1* | 1/2019 | Tiwary | G06F 9/45558 |

OTHER PUBLICATIONS

Spinner, "Runtime Vertical Scaling of Virtualized Applications via Online Model Estimation", 2014, pp. 1-10.

U.S. Office Action issued in U.S. Appl. No. 15/801,878 dated Apr. 15, 2019, 16 pages.

U.S. Notice of Allowance issued in U.S. Appl. No. 15/801,878 dated Jan. 27, 2021, pp. 1-10.

* cited by examiner

MULTI-LAYER AUTOSCALING FOR A SCALE-UP CLOUD SERVER

BACKGROUND

Technical Field

The present invention relates to scaling technology.

Description of the Related Art

In a conventional cloud system, an autoscaling function is implemented that automatically scales the performance of applications.

SUMMARY

According to a first aspect of the present invention, a computer-implemented scaling method for detecting whether a performance of a system, which executes an application using a layered software environment that provides one or more lower layer software environments below an upper layer software environment, reaches a target performance is provided. The method also includes scaling the layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled. The method further includes scaling hardware resources used for executing the layered software environment in the system in response to the performance of the system not reaching the target performance before scaling of the first layer software environment or after scaling of the second layer software environment.

According to a second aspect of the present invention, a computer program product including a computer readable storage medium having program instructions embodied therewith, the program instructions executable by a device to cause the device to perform operations for detecting whether a performance of a system, which executes an application using a layered software environment that provides one or more lower layer software environments below an upper layer software environment, reaches a target performance is provided. The computer program product also includes scaling the layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled. The computer program product further includes scaling hardware resources used for executing the layered software environment in the system in response to the performance of the system not reaching the target performance before scaling of the first layer software environment or after scaling of the second layer software environment.

According to a third aspect of the present invention, an apparatus includes a detecting section configured to detect whether performance of a system, which executes an application using a layered software environment that provides one or more lower layer software environments below an upper layer software environment, reaches a target performance is provided. The apparatus includes a software environment scaling section configured to scale the layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled. The apparatus also includes a hardware resource scaling section configured to scale hardware resources used for executing the layered software environment in the system in response to the performance of the system not reaching the target performance before scaling of the first layer software environment or after scaling of the second layer software environment.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

The following description will provide details of preferred embodiments with reference to the following figures wherein.

DETAILED DESCRIPTION

Hereinafter, embodiments of the present invention will be described. The embodiments do not limit the invention according to the claims, and all the combinations of the features described in the embodiments are not necessarily essential to means provided by aspects of the invention.

Figure 1:
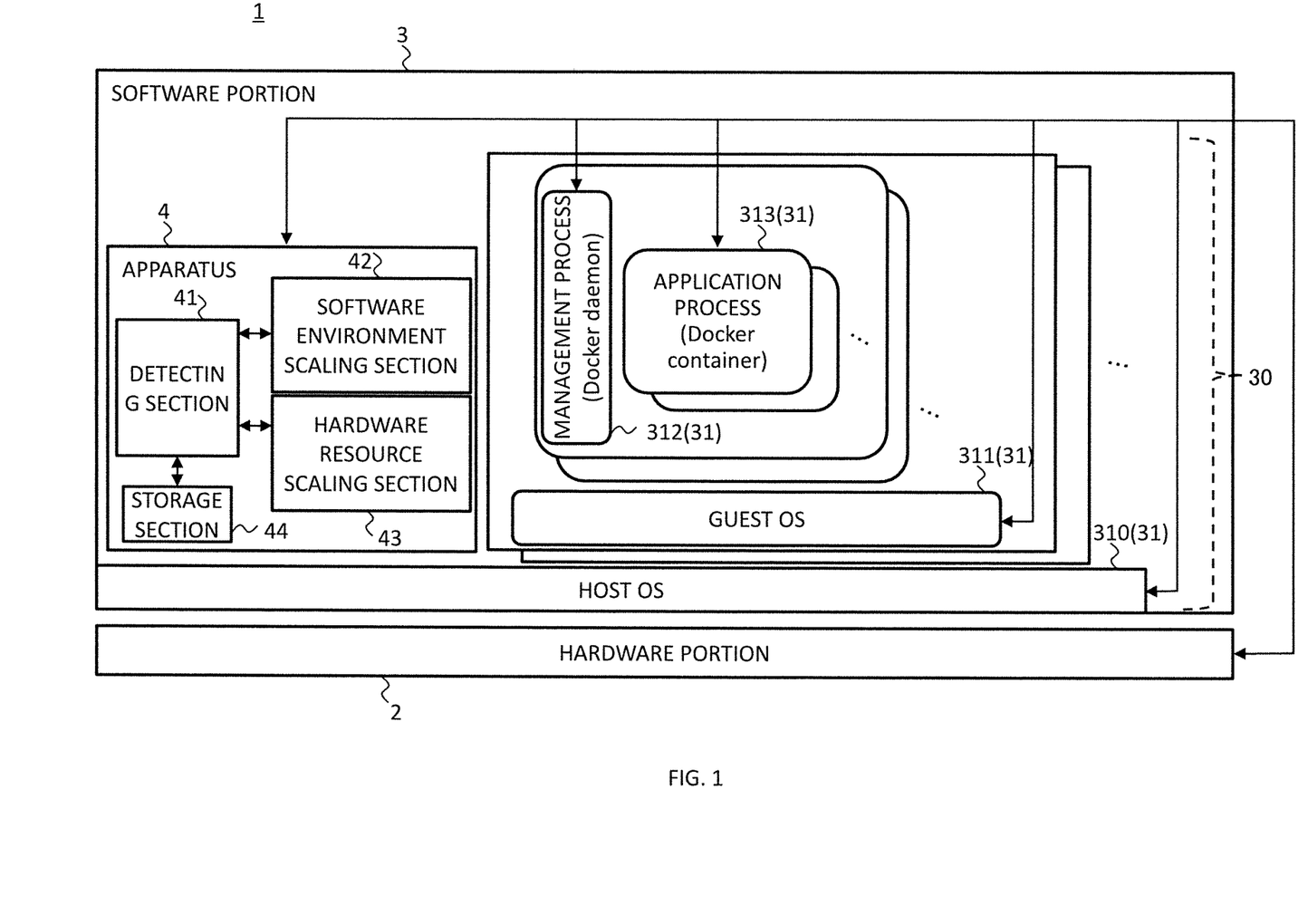
FIG. 1 is a block diagram showing a system, in accordance with an embodiment of the present invention.

FIG. 1 shows a system 1 according to an embodiment of the present invention. The system 1 executes an application, such as a web application, using a layered software environment 30. In one embodiment, the system 1 may be a cloud system, and may be a system that provides a service to a user via a network, which is not shown in the drawings. The system 1 includes a hardware portion 2 and a software portion 3.

The hardware portion 2 is a portion that physically forms the system 1, and may include one or more CPUs, one or more memories, one or more storages, and the like. In another embodiment, the hardware portion 2 may be a z System manufactured by International Business Machines Corporation.

The software portion 3 is a functional portion that is realized by the hardware portion 2 reading various programs and data, and includes a layered software environment 30 and an apparatus 4.

The layered software environment 30 includes a plurality of software environments 31 that are layered, and provides one or more software environments 31 of lower layers that are below a software environment 31 of an upper layer. In yet another embodiment, the layered software environment 30 is described as being a container type, i.e. providing a unique user space for each user, but may instead be a hypervisor type or host type. The plurality of software environments 31 included in the layered software environment 30 may be one or more host OSs 310, one or more guest OSs 311, one or more management processes 312, and one or more application processes 313, in order from the upper side to the lower side.

The one or more host OSs 310 are executed in the hardware portion 2. In one embodiment, the one or more host OSs 310 are each a z/VM manufactured by International Business Machines Corporation, but at least some of these may be other host OSs.

The one or more guest OSs 311 create a virtual machine environment in the host OSs 310. In another embodiment, the one or more guest OSs 311 are each a SUSE Linux® Enterprise Server (SLES), but at least some of these may be other guest OSs.

The one or more management processes 312 respectively manage the corresponding one or more application processes 313. In yet another embodiment, the one or more management processes 312 are each a Docker daemon, but at least some of these may be other management processes.

The one or more application processes 313 execute one or more applications on the guest OSs 311 while being managed by the management processes 312. Each application process 313 may be a unique user space of a user that uses the system 1. In one embodiment, each application process 313 may be a container-type virtual environment that provides a virtual OS environment as a container on the guest OS 311, and may be a Docker container, for example. The one or more application processes 313 each execute one or more applications in a virtual machine environment realized in Java®, but at least some of these may be other application processes and may execute applications in other languages.

The apparatus 4 performs scaling of the system 1. The apparatus 4 includes a detecting section 41, a software environment scaling section 42, a hardware resource scaling section 43, and a storage section 44.

The detecting section 41 detects whether the performance of the system 1 reaches a target performance. Here, the performance of the system 1 may indicate at least one of the response time of an application executed in the layered software environment 30, the processing throughput of the application, and the usage rate of the CPU executing the application. The target performance is a target value for the performance. The target performance may be set based on a QoS certified for a user or the like. In another embodiment, the detecting section 41 may detect whether the response time of the application being executed in the layered software environment 30 is less than or equal to a threshold value.

The software environment scaling section 42 scales the layered software environment 30. In one embodiment, the software environment scaling section 42 may scale the first layer software environment 31 in response to the performance of the system 1 not reaching the target performance. Furthermore, the software environment scaling section 42 may scale the second layer software environment 31, which is above the first layer, in response to the performance of the system 1 not reaching the target performance despite the first layer software environment 31 being scaled. The software environment scaling section 42 may scale one layer of the software environment 31 at a time, from the bottommost layer to the topmost layer in the layered software environment 30, until the performance of the first system is no longer detected as not reaching the target performance.

Here, the scaling of the layered software environment 30 may be horizontal scaling of the software environments 31. In yet another embodiment, scaling the first layer software environment 31 may include increasing the number of first layer software environments 31 provided under the second layer software environment 31.

The hardware resource scaling section 43 scales the hardware resources used for executing the layered software environment 30. In one embodiment, the hardware resource scaling section 43 may scale the hardware resources in response to the performance of the system 1 not reaching the target performance before the scaling of the first layer software environment 31 or after the scaling of the second layer software environment 31.

Here, the scaling of the hardware resources may include vertical scaling for the layered software environment 30. The Scaling of the hardware resources may include increasing at least one of the number of physical CPUs executing the layered software environment 30 and the amount of memory allocated to the layered software environment 30. In one embodiment, the hardware resource scaling section 43 may increase the number of physical CPUs by increasing the number of virtual CPUs of the layered software environment 30, or may directly increase the number of physical CPUs. A CPU added through such an increase may refer to not only an entire processor, but also a core. The hardware resource scaling section 43 may increase the storage amount.

The storage section 44 stores various pieces of information used by the apparatus 4 to perform scaling. In another embodiment, the storage section 44 may store a previous response time ($RT_{prev}$) a current response time, ($RT_{current}$), and an action index, for each application executed in the layered software environment 30.

Here, the previous and current response times ($RT_{prev}$ and $RT_{current}$) are response times for applications being executed in the layered software environment 30, and are examples of indicators that indicate the performance of the system 1. The response times may be detected using an arbitrary technique. The current response time ($RT_{current}$) is the response time detected most recently, and is the response time immediately after a scaling action, such as an enhancement, is performed, for example. Furthermore, the previous response time ($RT_{prev}$) is the response time detected at a previous detection timing.

The action index indicates a scaling action to be performed by the apparatus 4. In yet another embodiment, the action index takes "0" indicating scaling of a CPU executing an application, "1" indicating scaling of an application process 313, "2" indicating scaling of a management process 312, and "3" indicating scaling of a guest OS 310.

With the system 1 described above, the software environments 31 are scaled if the performance is not improved as a result of scaling of the hardware resources, and the hardware resources are scaled if the performance is not improved as the result of scaling of a software environment 31. Accordingly, it is possible to reliably improve the performance compared to a case where simply scaling of the hardware resources or the software environments 31 is performed.

Since the software environments 31 are scaled using horizontal scaling, it is possible to reliably improve the performance by performing parallel processing if there is a bottleneck such as lock contentions in the software.

Furthermore, the first layer software environment 31 is scaled if the performance of the system 1 is not improved, and the second layer software environment 31 is scaled if the performance of the system 1 is not improved even when the first layer software environment 31 has been scaled. Accordingly, compared to a case where simply all of the layers of the software environment 31 are scaled and a case where the second layer and the first layer of the software environment 31 are scaled in order, it is possible to attempt an improvement of the performance while increasing the system resources being consumed in a stepped manner, and therefore it is possible to restrict the increase in the amount of system resources being consumed.

Furthermore, the software environments 31 are scaled one layer at a time in order from the bottommost layer to the topmost layer in the layered software environment 30, and therefore it is possible to reliably restrict the increase in the amount of system resources being consumed.

Figure 2:
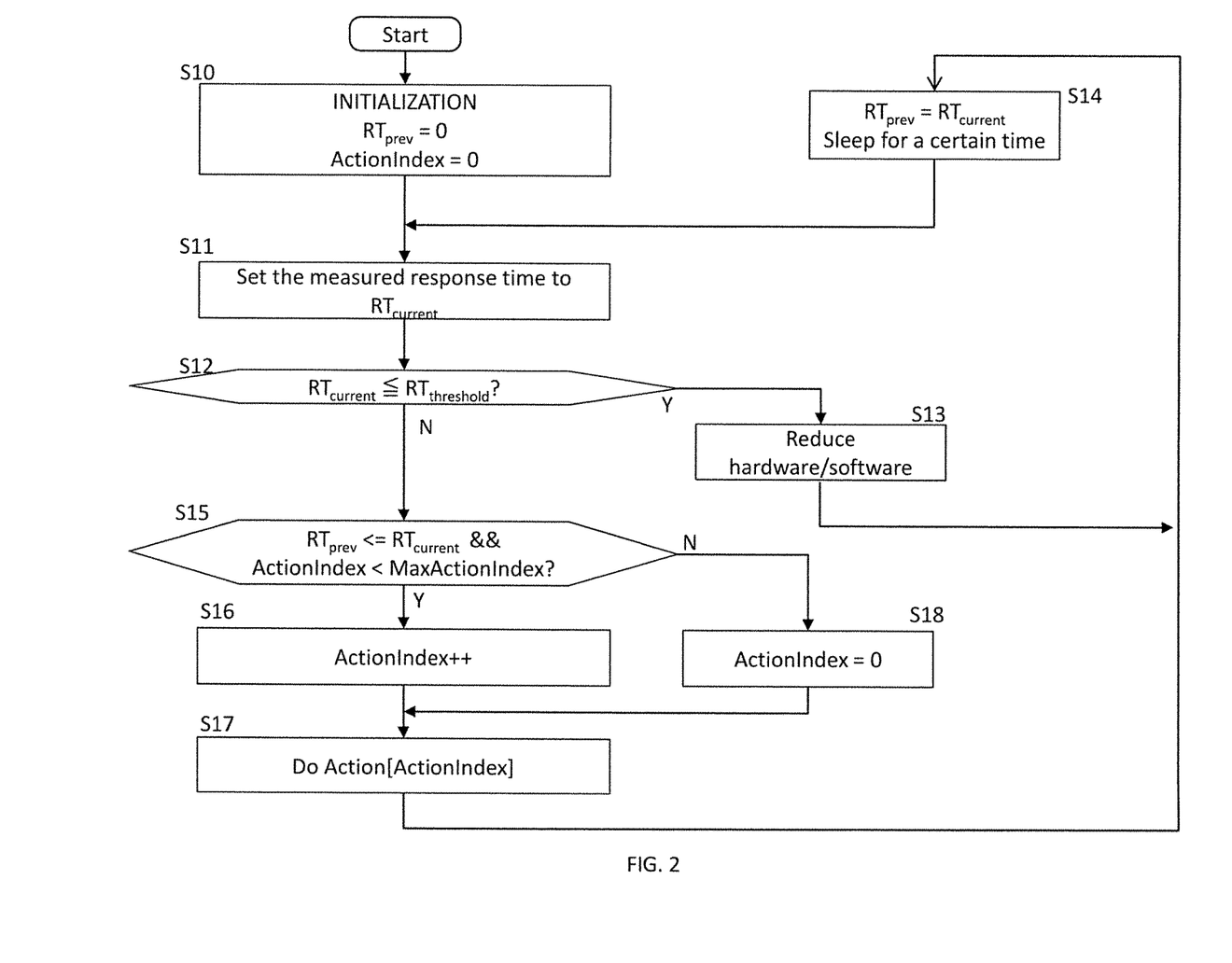
FIG. 2 is a flow diagram showing a method, in accordance with an embodiment of the present invention.

FIG. 2 shows a method according to the present embodiment. The apparatus 4 performs scaling using steps S10 to S18. In one embodiment, the apparatus 4 may perform the scaling actions in step S17.

First, at step S10, the apparatus 4 performs initialization. In another embodiment, the apparatus 4 may reset the stored content of the storage section 44. In yet another embodiment, the apparatus 4 sets the action index to zero and sets the previous response time ($RT_{prev}$) to zero, for each application executed in the layered software environment 30.

Next, at step S11, the detecting section 41 detects the performance of the system 1. In one embodiment, the detecting section 41 may detect the response time, set this response time as the current response time ($RT_{current}$) and update the response time ($RT_{current}$) in the storage section 44, for each application being executed in the layered software environment 30.

Next, at step S12, the detecting section 41 detects whether the performance of the system 1 reaches the target performance for each application being executed. In another embodiment, the detecting section 41 may detect whether the current response time ($RT_{current}$) is less than or equal to a threshold value ($RT_{threshold}$) for each application being executed. Here, the response time threshold value ($RT_{threshold}$) is an example of an indicator that indicates the target performance of the system 1. The threshold value ($RT_{threshold}$) may be set based on the QoS.

If the detection result is affirmative in step S12, i.e. if it is detected that the target performance has been reached (step S12: Yes), the detecting section 41 moves the process to step S13. On the other hand, if the detection result is negative in step S12, i.e. if it is detected that the target performance has not been reached (step S12: No), the detecting section 41 moves the process to step S15. In this way, in response to the performance of the system 1 not reaching the target performance, the hardware resources and/or the software environments 31 are scaled at step S17.

At step S13, the apparatus 4 reduces the hardware resources and/or the layered software environments 30. In one embodiment, in response to the performance of the system 1 being at least a predetermined margin greater than the target performance (e.g. response time ($RT_{current}$)≤ (threshold value ($RT_{threshold}$)−margin time) for each application being executed, the apparatus 4 may reduce one of the hardware resources and/or the software environments 31 executing the application. By setting this margin, it is possible to avoid performing scaling again when the performance of the system 1 does not reach the target performance immediately after the reduction. The margin may be set arbitrarily through trial and error.

In another embodiment, the apparatus 4 may undo the scaling caused by the scaling action at step S17. If the layered software environment 30 is reduced, the apparatus 4 may reduce the scaled software environments 31 in order from the topmost layer. For example, if the application processes 313, the management processes 312, and the guest OSs 311 are each scaled, the apparatus 4 may sequentially delete the application processes 313 on the scaled guest OSs 311. If there is no application process 313 managed by the management process 312 when an application process 313 is deleted, the apparatus 4 may delete the management process 312 along with this application process 313. Furthermore, if there is no management process 312 and application process 313 on a guest OS 311 when a management process 312 is deleted along with an application process 313, the apparatus 4 may delete the guest OS 311 along with these management process 312 and application process 313.

In the process of step S13, the apparatus 4 may set the action index to zero.

Next, at step S14, the apparatus 4 sleeps for a prescribed time (e.g. 60 seconds or 30 seconds), and moves the process to step S11. In the process of step S14, the detecting section 41 may set the previous current response time ($RT_{current}$) as the response time ($RT_{prev}$), and update the response times ($RT_{prev}$) the storage section 44, for each prev. application being executed.

At step S15, the detecting section 41 determines whether the response times ($RT_{current}$ and $RT_{prev}$) are such that ($RT_{current}$)≥($RT_{prev}$), i.e. the performance is not improved, and whether the action index is less than its max value (e.g. "3" in the present embodiment).

If the determination at step S15 is negative, i.e., if ($RT_{current}$)<($RT_{prev}$) and/or the action index is the max value (step S15: No), the detecting section 41 moves the process to step S18.

On the other hand, if the determination at step S15 is affirmative, the detecting section 41 moves the process to step S16. In this way, when the performance is not improved by the scaling action, the process moves to step S16.

At step S16, the apparatus 4 increases the action index by one.

At step S17, the apparatus 4 performs a scaling action indicated by the action index, and moves the process to step S14. In one embodiment, if the action index is "0," the hardware resource scaling section 43 scales a CPU executing the application. If the action index is "1," the software environment scaling section 42 scales an application process 313 executing the application. If the action index is "2," the software environment scaling section 42 scales an management process 312 executing the application. If the action index is "3," the software environment scaling section 42 scales a guest OS 310 executing the application.

If a CPU is scaled, the hardware resource scaling section 43 can increase the number of physical CPUs by increasing the number of virtual CPUs of a software environment 31 that does not reach the target performance by one CPU. Instead, the hardware resource scaling section 43 may directly increase the number of physical CPUs allocated to the software environment 31 that does not reach the target performance. In this case, the number of virtual CPUs allocated to the software environment 31 may be increased along with the increase in the number of physical CPUs. As an example, the hardware portion 2 of the system 1 has a 32-core CPU installed therein, and the number of cores initially allocated to the layered software environment 30 can be eight.

If an application process 313 is scaled, the software environment scaling section 42 adds one or more application processes 313 (e.g. a Docker container in one embodiment) of a software environment 31 that does not reach the target performance. If one or more management processes 312 have already been added due to the scaling action, the software environment scaling section 42 may add an application process 313 to the management process 312 that was most recently added.

The software environment scaling section 42 may add the application processes 313 by replicating any one pre-existing application process 313. Instead, the software environment scaling section 42 may add a new application process 313.

If a management process 312 is scaled, the software environment scaling section 42 adds one management process 312 (e.g. a Docker daemon in another embodiment) of a software environment 31 that does not reach the target performance. If one or more guest OSs 311 have already been added due to the scaling action, the software environment scaling section 42 may add a management process 312 on the guest OS 311 that was most recently added.

The software environment scaling section 42 may add the management processes 312 by copying any one pre-existing management process 312. In this case, the software environment scaling section 42 may copy a pre-existing management process 312 and each application process 313 that is a target of the management by this management process 312.

Instead, the software environment scaling section 42 may add a new management process 312. In this case, the software environment scaling section 42 may allocate one or more application processes 313 that are management targets to the added management process 312. The software environment scaling section 42 may add one or more application processes 313 to the added management process 312, or may migrate one or more pre-existing application processes 313 to the added management process 312.

If a guest OS 310 is scaled, the software environment scaling section 42 adds one guest OS 310 (e.g. an SLES in yet another embodiment) of a software environment 31 that does not reach the target performance, i.e. one virtual machine realized by a guest OS 310.

The software environment scaling section 42 may add the guest OS 310 by copying one or more pre-existing guest OSs 310. In one embodiment, the software environment scaling section 42 may copy a pre-existing virtual machine environment by copying a guest OS 310 and each management process 312 and application process 313 that are operating on this guest OS 310.

Instead, the software environment scaling section 42 may add a new guest OS 310. In another embodiment, the software environment scaling section 42 may form a new virtual machine environment by allocating, to the added guest OS 310, one or more sets of a management process 312 and one or more application processes 313 operating on this guest OS 310. The software environment scaling section 42 may add one or more new sets of a management process 312 and one or more application processes 313 into the new virtual machine environment, or may migrate one or more pre-existing sets of a management process 312 and one or more application processes 313 into the new virtual machine environment.

At step S18, the apparatus 4 sets the action index to zero. In this way, if the performance is improved, scaling of a CPU is performed at step S17.

The following describes a modification of one embodiment.

The detecting section 41 of the present modification detects a software environment 31 causing a bottleneck in the system 1. In another embodiment, the detecting section 41 may detect the bottleneck by monitoring the state of lock contention occurrences of at least one software environment 31 (e.g. each software environment 31) in the layered software environment 30.

Here, the lock contention may be a ratio of the number of threads waiting for a lock to the total number of threads. Instead, the lock contention may be an average number of spins needed to acquire a lock.

The software environment scaling section 42 scales the software environment 31 causing the bottleneck. In yet another embodiment, the software environment scaling section 42 may scale a software environment 31 on a condition that the amount of lock contentions occurring in this software environment 31 exceeds an allowable amount. In this way, it is possible to reliably improve the performance when lock contentions occur.

The following describes the method performed by the apparatus of the present modification.

Figure 3:
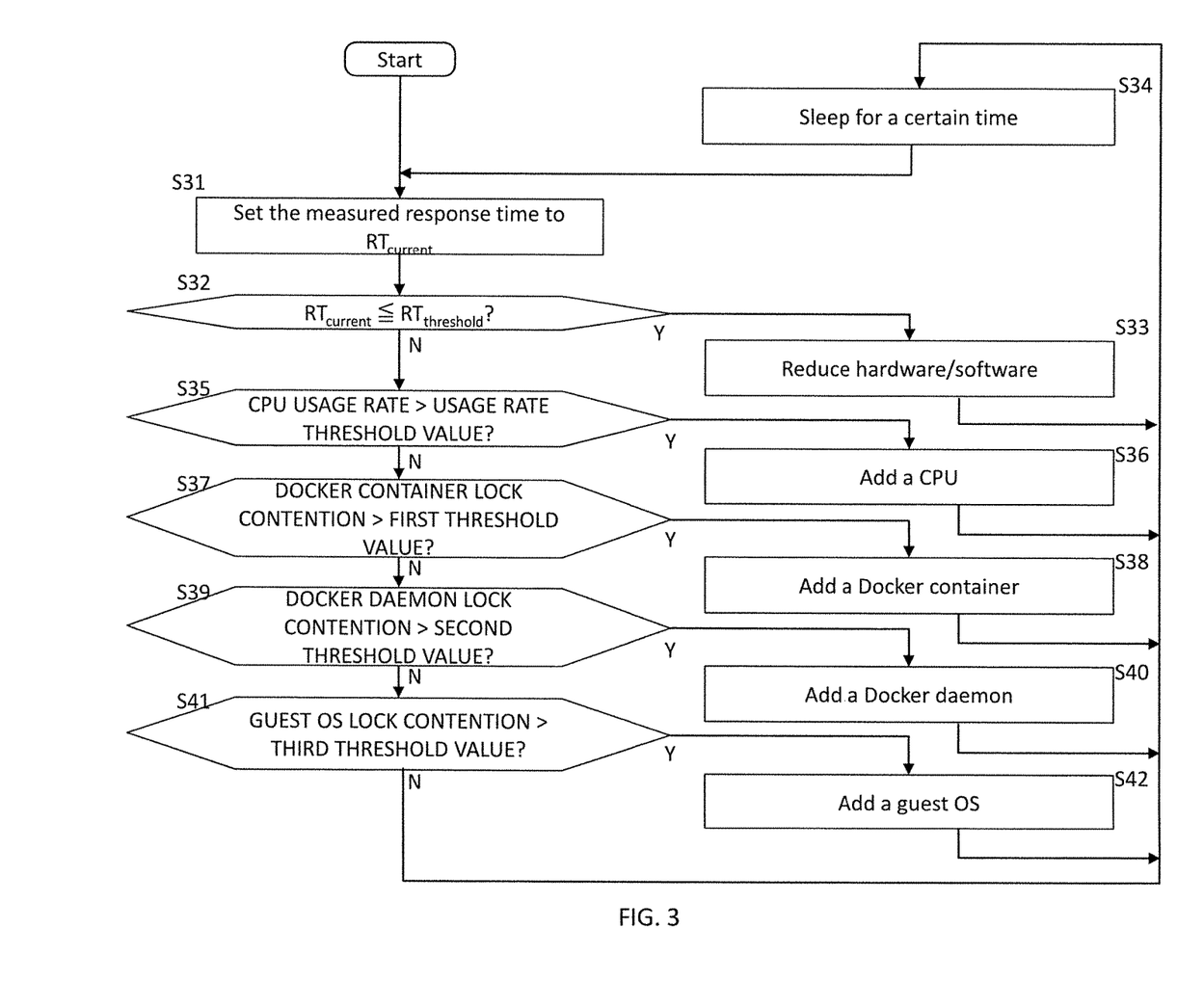
FIG. 3 is a flow diagram showing a modified method, in accordance with an embodiment of the present invention.

FIG. 3 shows a modification of the method according to one embodiment. The apparatus 4 performs scaling using steps S31 to S42.

First, at step S31, in the same manner as in step S11 described above, the detecting section 41 detects the performance of the system 1.

Next, at step S32, in the same manner as in step S12 described above, the detecting section 41 detects whether the performance of the system 1 reaches the target performance. As an example, the detecting section 41 may detect whether the current response time ($RT_{current}$) is less than or equal to the threshold value ($RT_{threshold}$), for each application being executed. If the detection result is affirmative in step S32 (step S32: Yes), the detecting section 41 moves the process to step S33. On the other hand, if the detection result is negative in step S32 (step S32: No), the detecting section 41 moves the process to step S35.

At step S33 the apparatus 4 reduces the hardware resources and/or the layered software environment 30, in the same manner as in step S13 described above.

Next, at step S34, the apparatus 4 sleeps for a prescribed time (e.g. 60 seconds or 30 seconds) in the same manner as in step S14 described above, and moves the process to step S31.

At step S35, the detecting section 41 detects whether the usage rate of the CPU executing the application exceeds a usage rate threshold value. The usage rate of the CPU executing the application may be the usage rate of all of the CPUs executing applications in the layered software environment 30. The usage rate threshold value may be set based on the QoS, and may be 60%, for example.

If the detection result at step S35 is affirmative (step S35: Yes), the detecting section 41 moves the process to step S36. On the other hand, if the detection result at step S35 is negative, the process moves to step S37.

At step S36, in the same manner as in step S17 described above, the hardware resource scaling section 43 scales the hardware resources (e.g. the CPUs in one embodiment) used for executing the layered software environment 30, and moves the process to step S34.

At step S37, the detecting section 41 detects whether the lock contentions in one or more application processes 313 (e.g. Docker containers in another embodiment) exceed a first threshold value. The first threshold value is one example of the allowable amount described above. The first threshold value may be set based on the QoS, and may be 10% or the like, for example.

Here, the detecting section 41 may detect a representative value (e.g. an average value or maximum value) of lock contentions based on the execution state of all threads being executed by all of the application processes 313, as the lock contention value. Instead, the detecting section 41 may estimate the representative value of the lock contentions based on the execution state of a portion of the threads from among all threads being executed by all of the application processes 313. The portion of the threads may be selected randomly, may be selected from among threads executed by one or more application processes 313 having the highest CPU usage rates, or may be selected from among threads executed by one or more application processes 313 most recently scaled.

If an application process 313 is executing an application in a virtual machine environment using Java®, the detecting section 41 may detect lock contentions using a Java® lock monitor. As an example, the detecting section 41 may detect the lock contentions by detecting the average number of spins needed to acquire a lock using the Java® lock monitor as the overhead time caused by spin weight.

If the detection result at step S37 is affirmative (step S37: Yes), the detecting section 41 moves the process to step S38. On the other hand, if the detection result at step S37 is negative, the process moves to step S39.

At step S38, in the same manner as in step S17 described above, the software environment scaling section 42 adds an application process 313 (e.g. a Docker container in one embodiment) and moves the process to step S34.

At step S39, the detecting section 41 detects whether the lock contentions in the management processes 312 (e.g. the Docker daemons in another embodiment) exceed a second threshold value. The second threshold value is an example of the allowable amount described above. The second threshold value may be set based on the QoS, and may be 10% or the like, for example. The second threshold value may the same as or different from the first threshold value.

Here, the detecting section 41 may detect a representative value of lock contentions based on the execution state of all threads being executed by all of the management processes 312, as the lock contention value. Instead, the detecting section 41 may estimate the representative value of the lock contentions based on the execution state of a portion of the threads from among all threads being executed by all of the management processes 312. The portion of the threads may be selected randomly, may be selected from among threads executed by one or more management processes 312 having the highest CPU usage rates, or may be selected from among threads executed by one or more management processes 312 most recently scaled.

In order to detect the lock contentions, the detecting section 41 may perform a thread dump in the one or more management processes 312 and specify the amount of threads in a lock-awaiting state. Here, the thread dump may include acquiring a snapshot (e.g. a function call state) of the threads in a Java® environment. In yet another embodiment, the detecting section 41 may detect the lock contentions by sampling the thread dump using a profiler "pprof" written in Go and counting the number of lock-awaiting threads. To detect the lock-awaiting threads from the plurality of threads, it is only necessary to create in advance a list of functions capable of causing lock contentions and compare these functions to functions in the thread dump. The functions in the thread dump may be expressed by names in the programming language being used in the management processes 312, or may be expressed by names in the programming language being used in the guest OSs.

If the detection result at step S39 is affirmative (S39: Yes), the detecting section 41 moves the process to step S40. On the other hand, if the detection result at step S39 is negative, the process moves to step S41.

At step S40, in the same manner as step S17, the software environment scaling section 42 adds one management process 312 (e.g. a Docker daemon in one embodiment), and moves the process to step S34.

At step S41, the detecting section 41 detects whether the lock contention in the guest OSs 310 (e.g., SLESs in one embodiment) exceeds a third threshold value. The third threshold value is an example of the allowable amount described above. The third threshold value may be set based on the QoS, and may be 10% or the like, for example. The third threshold value may the same as or different from the first threshold value and/or the second threshold value.

Here, the detecting section 41 may detect a representative value of lock contentions based on the execution state of all threads being executed by all of the guest OSs 310, as the lock contention value. Instead, the detecting section 41 may estimate the representative value of the lock contentions based on the execution state of a portion of the threads from among all threads being executed by all of the guest OSs 310. The portion of the threads may be selected randomly, may be selected from among threads executed by one or more guest OSs 310 having the highest CPU usage rates, or may be selected from among threads executed by one or more guest OSs 310 most recently scaled.

In the same manner as in step S39 described above, in order to detect the lock contentions, the detecting section 41 may perform a thread dump in the one or more guest OSs 310 and specify the amount of threads in a lock-awaiting state. In one embodiment, the detecting section 41 may detect the lock contentions by sampling the thread dump using a kill-3 command of Linux® and counting the number of lock-awaiting threads of pthreads in Linux®.

If the detection result at step S41 is affirmative (S41: Yes), the detecting section 41 moves the process to step S42. On the other hand, if the detection result at step S41 is negative, the process moves to step S34.

In the same manner as in S17, at step S42, the software environment scaling section 42 adds one guest OS 310 (e.g. an SLES in another embodiment), i.e. one virtual machine realized by a guest OS 310, and moves the process to step S34.

In the embodiments and modification described above, the apparatus 4 is provided in the software portion 3, but at least a portion of the apparatus 4 may be provided in the hardware portion 2.

Furthermore, the hardware resources (e.g. the CPUs) are described as being scaled before the software environment 31 is scaled, but instead of or in addition to this, the hardware resources may be scaled after the software environment 31 is scaled. In another embodiment, the apparatus 4 may set the max value of the action index as indicating scaling of a CPU. Furthermore, the apparatus 4 may perform the processes of steps S35 and S36 if the judgment at step S41 is negative (step S41: No). In this way, since the locks are decreased prior to the CPU scaling if the CPU is consumed by a spin lock, it is possible to improve the performance at an early stage.

In one embodiment, the performance of the system 1 is detected to reach the target performance in a prescribed interval if the hardware resources and the software environment 31 are scaled, but the interval may be changed according to the performance value (e.g. application response time) of the system 1. In another embodiment, the interval may be changed to be shorter if the application response time is short.

In yet another embodiment, the software environment scaling section 42 scales the application processes 313, the management processes 312, and the guest OSs 311 in the stated order, but may further scale the host OSs 310 in the same manner.

Figure 4:
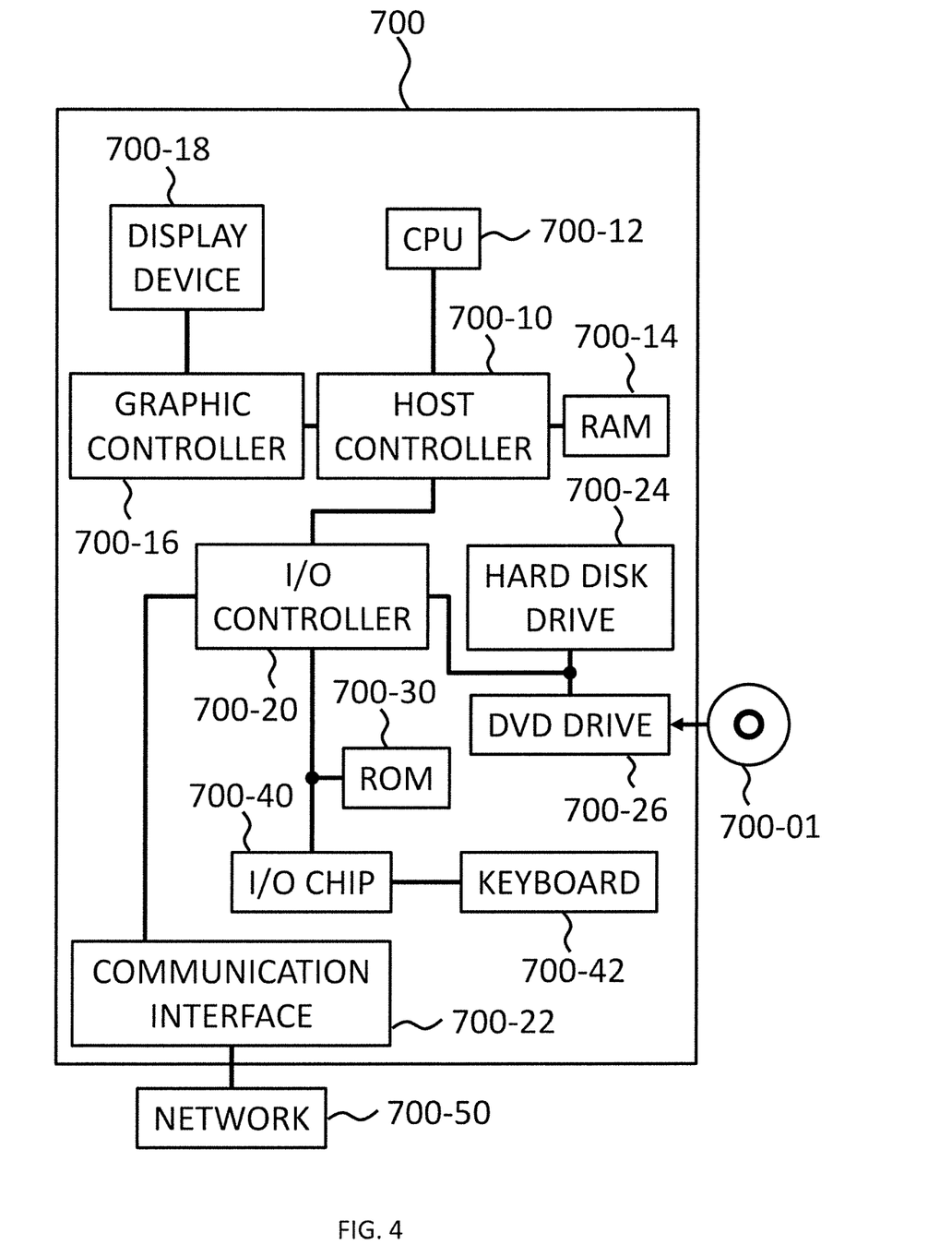
FIG. 4 is a block diagram showing a computer system, in accordance with an embodiment of the present invention.

FIG. 4 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to one embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. In one embodiment, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, with the embodiments of the present invention, it is possible to reliably improve the performance of the systems described herein.

What is claimed is:

1. A computer program product comprising a computer readable storage medium having program instructions embodied therewith, the program instructions executable by a device to cause the device to perform operations comprising:
    detecting whether a performance of a system, which executes an application using a layered software environment that provides one or more lower layer software environments below an upper layer software environment, reaches a target performance;
    horizontally scaling the layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled; and
    vertically scaling hardware resources used for executing the layered software environment in the system in response to the performance of the system not reaching the target performance based on a response time of the application and a central processing unit (CPU) usage rate before scaling of the first layer software environment based on a lock contention.

2. The computer program product according to claim 1, wherein the horizontally scaling the layered software environment includes scaling the software environments one layer at a time from a bottommost layer to a topmost layer in the layered software environment, until it is no longer detected that the performance of the system does not reach the target performance.

3. The computer program product according to claim 1, wherein the scaling the first layer software environment includes increasing the number of first layer software environments provided below the second layer software environment.

4. The computer program product according to claim 1, wherein the operations further comprise reducing the layered software environment, including reducing a software environment of one layer in the layered software environment in response to the performance of the system being greater than the target performance by at least a predetermined margin.

5. The computer program product according to claim 1, wherein the operations further comprise monitoring a state of lock contention occurrences of at least one software environment in the layered software environment, and
    the horizontally scaling the layered software environment includes scaling the first layer software environment on a further condition that an amount of lock contentions occurring in the first layer software environment exceeds an allowable amount.

6. An apparatus comprising a processor and the computer program product according to claim 1.

7. An apparatus comprising:
    at least one processor operatively coupled to a memory device, the at least one processor being configured to:
    detect whether a performance of a system, which executes an application using a layered software environment that provides one or more lower layer software environments below an upper layer software environment, reaches a target performance;
    horizontally scale the layered software environment, including scaling a first layer software environment in the layered software environment in response to the performance of the system not reaching the target performance and scaling a second layer software environment that is above the first layer software environment in the layered software environment in response to the performance of the system not reaching the target performance despite the first layer software environment being scaled; and
    vertically scale hardware resources used for executing the layered software environment in the system in response to the performance of the system not reaching the target performance based on a response time of the application and a central processing unit (CPU) usage rate before scaling of the first layer software environment based on a lock contention.

* * * * *